(12) United States Patent  
Cleveland et al.

(10) Patent No.: US 8,683,131 B2
(45) Date of Patent: *Mar. 25, 2014

(54) DIRECT MEMORY ADDRESS FOR SOLID-STATE DRIVES

(71) Applicant: International Business Machines Corporation, Armonk, NY (US)

(72) Inventors: Lee D. Cleveland, West Concord, MN (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/798,944

(22) Filed: Mar. 13, 2013

(65) Prior Publication Data

US 2013/0191594 A1  Jul. 25, 2013

Related U.S. Application Data

(63) Continuation of application No. 13/250,343, filed on Sep. 30, 2011.

(51) Int. Cl.
*G06F 12/10* (2006.01)
(52) U.S. Cl.
USPC ............ 711/135; 711/103; 711/114; 711/207
(58) Field of Classification Search
USPC ................................. 711/135, 103, 114, 207
See application file for complete search history.

(56) References Cited

U.S. PATENT DOCUMENTS

| | | | |
|---|---|---|---|
| 6,173,385 B1 | 1/2001 | Tuma et al. | |
| 6,697,923 B2 | 2/2004 | Chen et al. | |
| 7,359,244 B2 | 4/2008 | Kobayashi et al. | |
| 7,412,546 B2 | 8/2008 | Basso et al. | |
| 7,778,092 B2 | 8/2010 | Klein | |
| 8,068,365 B2 | 11/2011 | Kim | |

(Continued)

FOREIGN PATENT DOCUMENTS

| | | |
|---|---|---|
| JP | 2009003569 A | 1/2009 |
| WO | WO9518407 A1 | 7/1995 |
| WO | WO2007135077 B1 | 1/2008 |
| WO | WO2009049546 A1 | 4/2009 |

OTHER PUBLICATIONS

Response to the Combined Search and Examination Report dated Jan. 23, 2013, Application No. GB1216336.6, 2 pages.
U.S. Appl. No. 13/250,343.

(Continued)

*Primary Examiner* — Yong Choe
(74) *Attorney, Agent, or Firm* — Stephen R. Tkacs; Stephen J. Walder, Jr.; Randall J. Bluestone

(57) ABSTRACT

A storage device is provided for direct memory access. A controller of the storage device performs a mapping of a window of memory addresses to a logical block addressing (LBA) range of the storage device. Responsive to receiving from a host a write request specifying a write address within the window of memory addresses, the controller initializes a first memory buffer in the storage device and associates the first memory buffer with a first address range within the window of memory addresses such that the write address of the request is within the first address range. The controller writes to the first memory buffer based on the write address. Responsive to the buffer being full the controller persists contents of the first memory buffer to the storage device using logical block addressing based on the mapping.

14 Claims, 4 Drawing Sheets

(56) References Cited

U.S. PATENT DOCUMENTS

| | | |
|---|---|---|
| 2003/0196021 A1 | 10/2003 | Botchek |
| 2008/0162788 A1 | 7/2008 | Yu |
| 2008/0250194 A1 | 10/2008 | Chen |
| 2009/0172260 A1 | 7/2009 | Olbrich et al. |
| 2009/0222613 A1 | 9/2009 | Kurashige |
| 2010/0057976 A1 | 3/2010 | Lasser |
| 2010/0185808 A1 | 7/2010 | Yu et al. |
| 2010/0241792 A1 | 9/2010 | Lee |
| 2011/0208905 A1 | 8/2011 | Shaeffer et al. |

OTHER PUBLICATIONS

Sanvido, Marco A. et al., "NAND Flash Memory and Its Role in Storage Architectures", Proceedings of the IEEE, vol. 96, No. 11, Nov. 2008, pp. 1864-1874.

Wu, Guanying et al., "An Adaptive Write Buffer Management Scheme for Flash-Based SSDs", ACM Transactions on Storage, vol. 8, No. 1, Article 1, Feb. 2012, 24 pages.

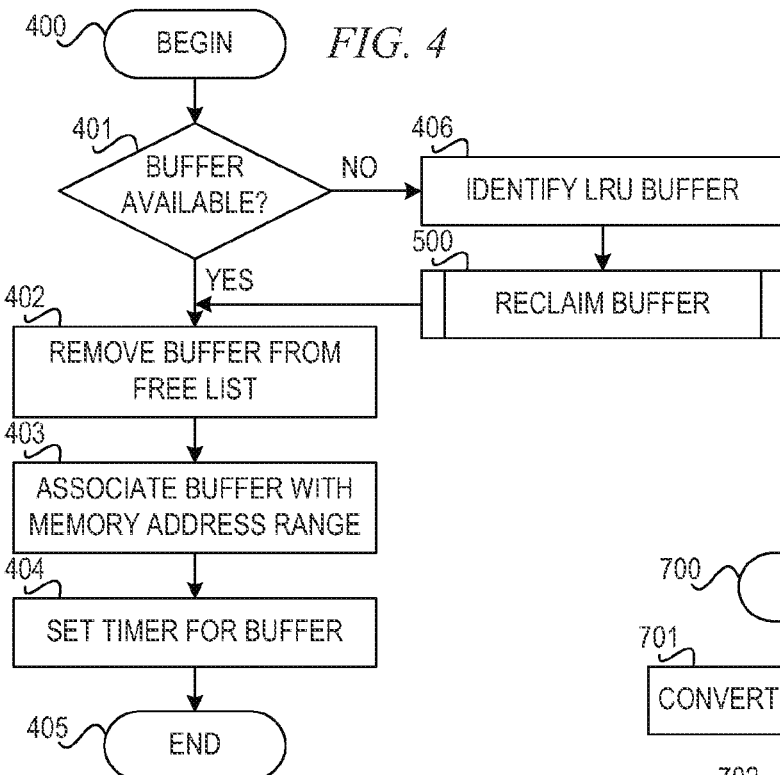
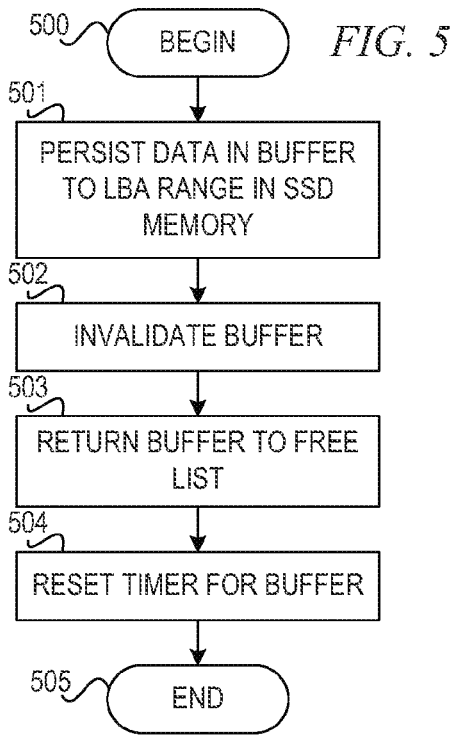
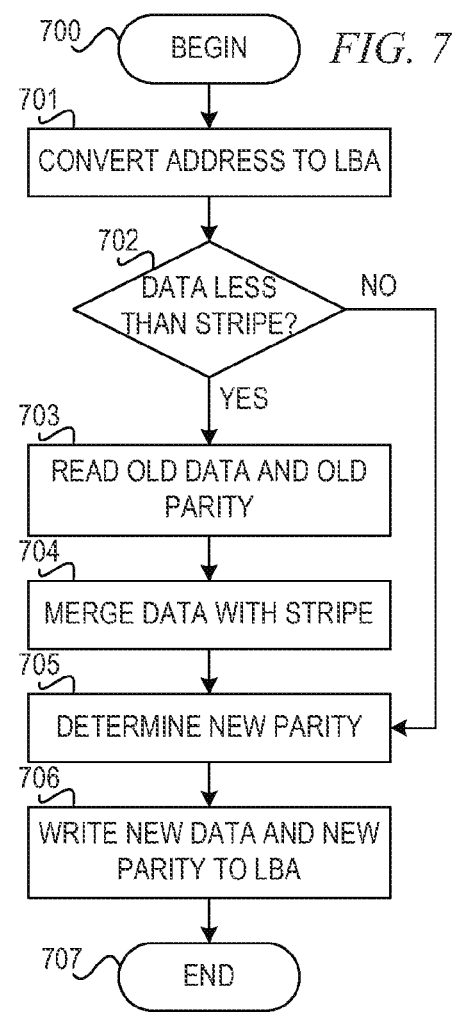

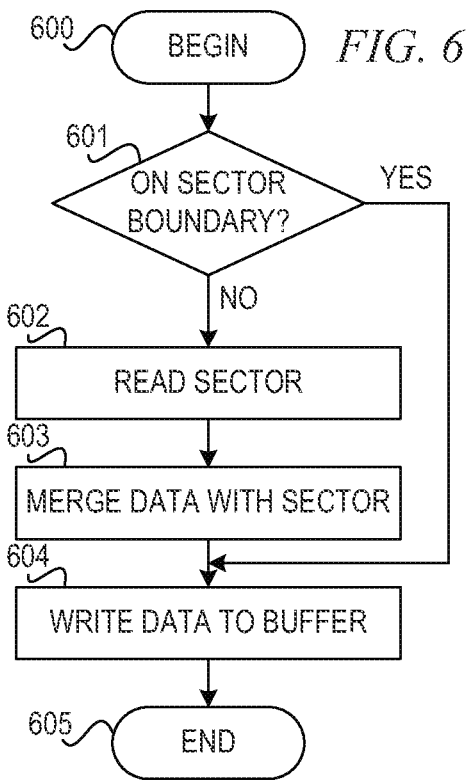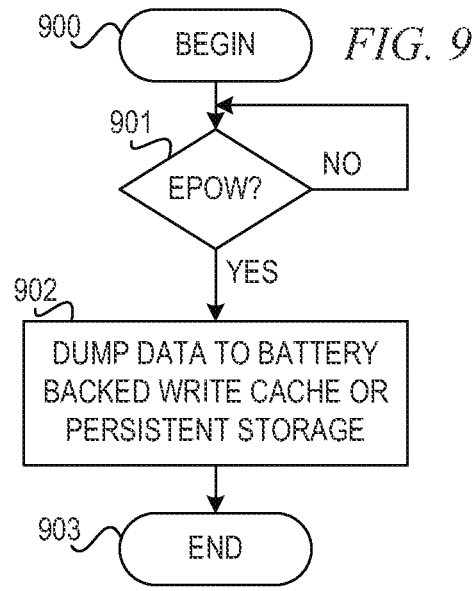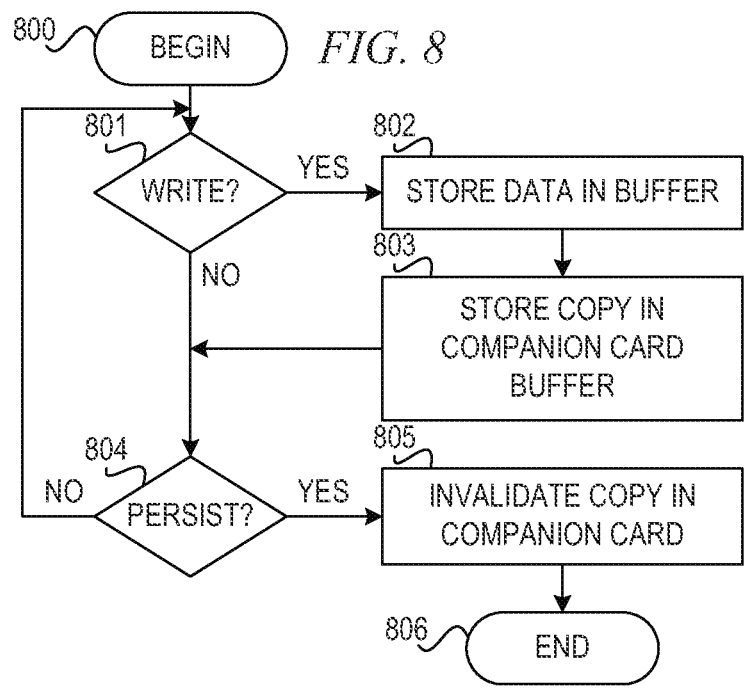

U S 8,683,131 B2

DIRECT MEMORY ADDRESS FOR SOLID-STATE DRIVES

BACKGROUND

The present application relates generally to an improved data processing apparatus and method and more specifically to mechanisms for direct memory addressing solid-state storage devices.

A solid-state drive (SSD) is a data storage device that uses solid-state memory to store persistent data with the intention of providing access in the same manner of a traditional block I/O hard disk drive. SSDs are distinguished from traditional hard disk drives (HDDs), which are electromechanical devices containing spinning disks and movable read/write heads. SSDs, in contrast, use microchips that retain data in non-volatile memory chips and contain no moving parts. Compared to electromechanical HDDs, SSDs are typically less susceptible to physical shock, are quieter, and have lower access time and latency. However, many SSDs use the same interface as hard disk drives, such as serial attached SCSI (SAS), serial advanced technology attachment (SATA), and Fibre Channel, thus allowing both HDDs and SSDs to be used in the same enclosure and allowing applications to seamlessly take advantage of either. Using interfaces designed for HDDs results in added latency from several sources. First of all, if the SSD is out in the SAN, there are SAN fabric delays, and delays by the external storage controller for directory lookups and the like. For SSDs present on the PCI Express link, the most significant form of latency is actually software latency to go through the software driver and then wait for the DMA to complete and to process the completion status.

Some SSDs may be attached to peripheral component interconnect express (PCIe) interfaces. This is an effective way to reduce latency. Because non-volatile memories used in SSDs, i.e., Flash memories, are block oriented and require erases before they can be written to, software drivers use HDD access methods to write and read data. This involves building a scatter/gather list and sending control blocks to the PCIe card to tell the SSD where to fetch data and then completion status must be sent to the driver that the operation is finished. This method of interface results in significant added latency to build the scatter gather lists, send the command to the storage device, wait for the DMA to complete and finally the ending status.

SUMMARY

In one illustrative embodiment, a method is provided for direct memory access in a storage device. The method comprises performing a mapping of a window of memory addresses to a logical block addressing (LBA) range of the storage device and responsive to receiving from a host a write request specifying a write address within the window of memory addresses, initializing a first memory buffer in the storage device. The method further comprises associating the first memory buffer with a first address range within the window of memory addresses such that the write address of the request is within the first address range. The method further comprises writing to the first memory buffer based on the write address and responsive to the buffer being full, persisting contents of the first memory buffer to the storage device using logical block addressing based on the mapping.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a solid-state drive is provided. The solid-state drive comprises a plurality of memory buffers, a solid-state memory, and a controller. The controller is configured to respond to receiving from a software application a request to access data at a memory address in the solid-state drive, convert the memory address to a logical block addressing (LBA) address, and perform an access operation to access a solid-state memory in the solid-state drive using the LBA address.

The solid-state drive may comprise one or more controllers and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a solid-state drive controller for initializing a buffer in accordance with an illustrative embodiment;

FIG. 5 is a flowchart illustrating operation of a controller for reclaiming a buffer in accordance with an illustrative embodiment;

FIG. 6 is a flowchart illustrating operation of a solid-state controller for persisting data from a buffer to solid-state drive memory in accordance with an illustrative embodiment;

FIG. 7 is a flowchart illustrating operation of a controller for converting data to logical block addressing and writing the blocks to a solid-state drive configured for striping in accordance with an illustrative embodiment;

FIG. 8 is a flowchart illustrating operation of a controller for storing in a companion card buffer in accordance with an illustrative embodiment; and FIG. 9 is a flowchart illustrating operation of a controller for handling a power event in accordance with an illustrative embodiment.

DETAILED DESCRIPTION

The illustrative embodiments provide a mechanism for direct memory addressing for solid-state drives. The mechanism provides a conversion from memory addressing to sector addressing within a solid-state drive. The mechanism initializes the solid-state drive with a window of addresses accessible by a host. The host writes blocks of data directly to the window of memory accesses, thus writing directly to the solid-state drive rather than making calls to a driver. The solid-state drive includes a plurality of memory buffers. The mechanism writes the data written by the host to the memory buffers, maps the memory address range to sectors in the solid-state drive, and writes the data to the solid-state drive using logical block addressing (LBA). The host can have multiple threads active at one time. This means the host can write to an address at X and then later address Y and come back and write to the next contiguous address after X. Although the number of buffers has no bearing on this invention, modern day Symmetrical Multi Processor systems with Logical Partitions often have many threads active and an illustrative embodiment of this invention could have 32 or even 64 buffers, each started at a different address by the host. This solid state disk may be in a number of form factors including hard disk drive form factors, PCI Express cards or any number of custom form factors with PCI Express, Fibre Channel, SAS, SATA, DDR3 or any number of protocols.

Figure 1:
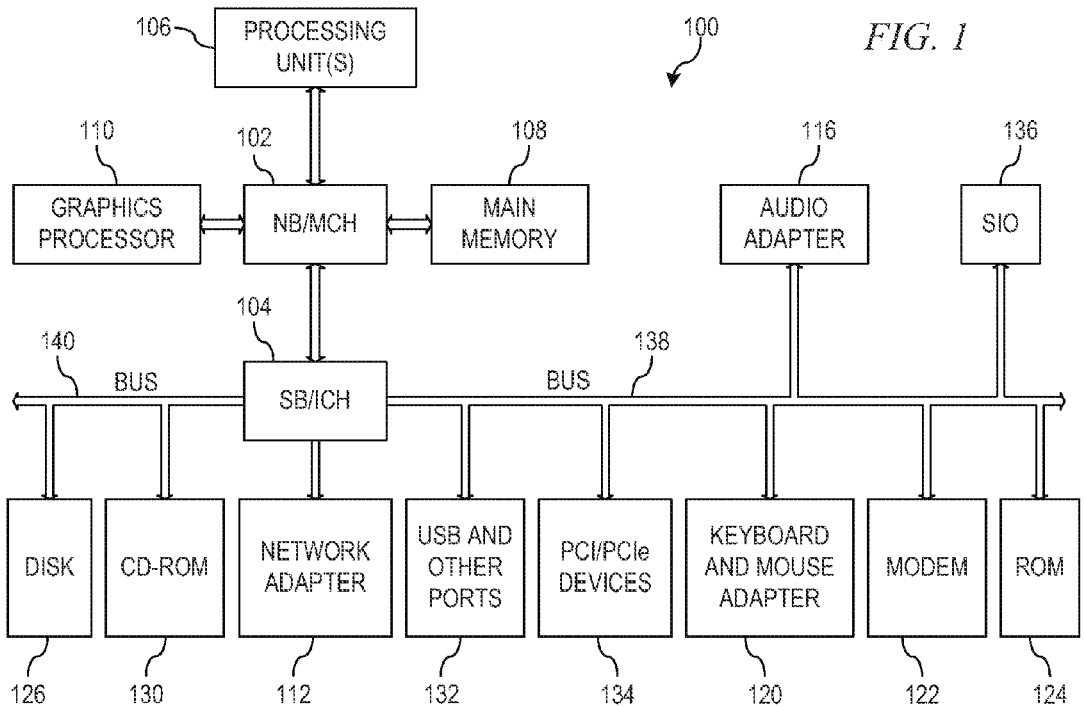
FIG. 1 is a block diagram of an example data processing system in which aspects of the illustrative embodiments may be implemented.

The illustrative embodiments may be utilized in many different types of data processing environments including a distributed data processing environment, a single data processing device, a storage system, an embedded computer system, or the like. In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may he made without departing from the spirit and scope of the present invention.

FIG. 1 is a block diagram of an example data processing system in which aspects of the illustrative embodiments may be implemented. In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port. (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 100 (Java is a trademark of Oracle and/or its affiliates.).

As a server, data processing system 100 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. The data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation, A solid-state drive (SSD) as described below with respect to the illustrative embodiments may be disk 126, may connect to PCI/PC le devices 134, or may connect directly to bus 138, for example.

Figure 2:
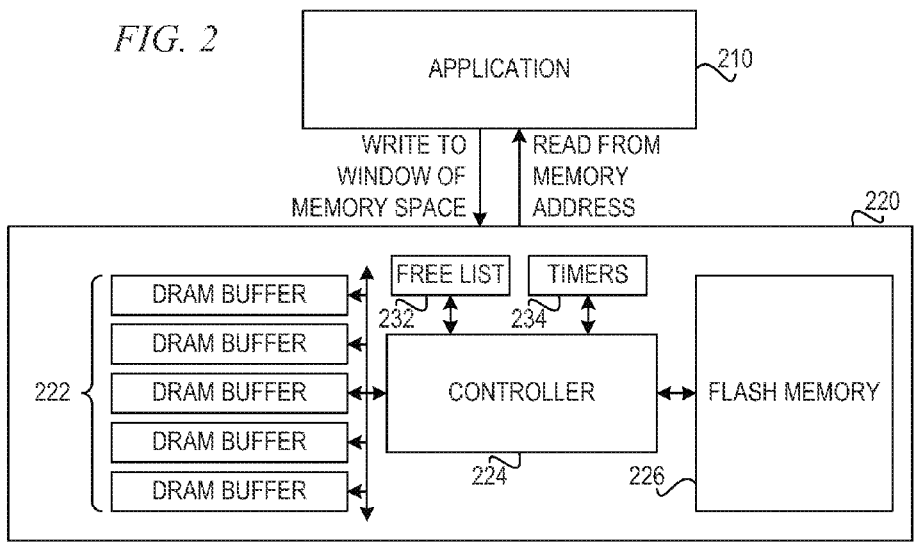
FIG. 2 is a block diagram illustrating direct memory addressing for a solid-state drive in accordance with an illustrative embodiment.

FIG. 2 is a block diagram illustrating direct memory addressing for a solid-state drive in accordance with an illustrative embodiment. Solid-state drive (SSD) 220 may be a PCIe device within PCI/PCIe devices 134 in FIG. 1, and application 210 may execute on processing unit 106 in FIG. 1, for example. Being able to write data to SSD 220 via PCIe allows a simpler interface and reduces latency. More particularly, application 210 may write to SSD 220 via direct memory addressing without using a device driver. Instead, application 210 directly writes to and reads from a window of memory addresses on SSD 220. In one example embodiment, the window of memory addresses comprises 32 GB of memory space. SSD 220 initializes a starting LBA address to which controller 224 maps the address window. In one example embodiment, controller 224 maps a 32 GB window to a logical unit number (LUN) with a LBA range from 0 to 32 GB/512-1, or 64 MB-1.

SSD 220 has a plurality of random access memory (RAM) buffers 222. These buffers may be either DRAM or SRAM, They may be part of an ASIC or external memory to the ASIC or FPGA. These buffers 222 allow for writes to take place at RAM speed, after which application 210 is done. DRAM buffers 222 may be 4K page memory buffers in one example embodiment. Other embodiments may implement 512 byte sector buffers. Controller 224 keeps track of available buffers in free list 232. Each time controller 224 initializes a buffer for use, controller 224 removes the buffer from free list 232, maps the buffer to an address range within the memory address space of SSD 220, and sets a time 234 for the buffer. In one example embodiment, the buffers may be dynamic random access memory (DRAM); however, the aspects of the illustrative embodiment would work equally well if the buffers were SRAM, new Phase Change Memory, MRAM, or other new technologies that may be marketed.

For best operation, SSD 220 expects application 210 to write integral numbers of 512 byte sectors, Because cache lines are smaller than 512 bytes, one expects a write to be broken up into a number of cache line writes. SSD 220 continues to accept writes until a buffer is full or some programmatic time is exhausted. These writes can be interleaved with other addresses written by the application and in this way multiple buffers can be filled up in parallel. Once a buffer fills up, it is written to the non volatile media and is now freed to accept different addresses. It is also the case that the controller 224 in SSD 220 may initialize a timer 234 associated with each buffer. Once a timer 234 expires or a buffer is full, controller 224 converts data in buffers 222 to a set of logical block address (LBA) blocks. Controller 224 converts the address to write to the LBA in the range in flash memory 226. For example, controller 224 would convert address 512M in the window to LBA 1M. Controller 224 may reclaim buffers when memory 7 buffers 222 are full or at least a predetermined percentage full. Controller 224 returns reclaimed buffers to free list 232.

Once the LBA block is arranged, controller 224 deals with the sectors exactly as it would if using normal hard disk drive (HDD) access methods, For example, if the LUN is set up for just a bunch of disks (JBOD), then the controller would simply write the data to the designated LBAs in flash memory 226.

If the LUN is set up for redundant array of independent disks (RAID) 5 or 6, which uses block-level striping with parity data distributed across all member disks, and the data written is less than a stripe, then controller 224 reads the old data and old parity from flash memory 226, merges the new data with the old data, and performs an XOR operation on the resulting stripe to determine a new parity. Controller 224 then writes the new stripe with the new parity to flash memory 226, It is preferable for performance for application 210 to write on sector (512 byte) boundaries. If the address does not start on a sector boundary or the data does not end on a sector boundary, then controller 224 reads the old sector from flash memory 226, merges the new data with the old data, and writes the resulting sector data to flash memory 226.

SSD 220 is capable of handling multiple threads and writes to different addresses. For a read, controller 224 simply converts the address to LBA and then accesses flash memory 226 according to the normal HDD access method. This uses the buffers in a similar way to the writes. The host processor likely does a read on a relatively small cache granularity like a cache line. Because reads to non volatile media have long latency, controller 224 reads an entire page (e.g., 4KB) and stores the page in a buffer. If the application requests to read the page, then the first read may take a relatively long latency to fill the buffer, but subsequent reads may be serviced out of the buffer. Once the application reads the entire page, that portion of the buffer is freed up to allow for another write or read. A timer may be used similarly to writes so no access for a certain amount of time results in the data being invalidated and the buffer freed for other usage.

In the event of a power outage, data written to the buffers, depending on the technology used to employ the buffers, can be lost. For example, if the buffers are DRAM or eDRAM or SRAM, then once power is removed the data is lost. Therefore, upon power outage, the power supply generates an early power off warning (EPOW). The controller may have an alternate energy source like a battery or bank of capacitors that can hold up power to the controller long enough to use one or more methods available in the industry for saving vital data on power outage. This may include dumping the data to a battery backed write cache on the SSD or writing the data to the persistent media while power to the controller is being held up by the alternate energy source.

One skilled in the art will also note that write data saved in buffers may be lost if the card fails or has a software problem. Therefore, mechanisms may be added by the SSD to send data to a companion card buffer. Data in the companion card is invalidated when the data is written to permanent media. More simply, a protocol may be developed for which the host is not given successful ending status until the write is completely processed, meaning the entire sector or page. The host may be responsible for retrying the operation upon a failure in a similar way the host would retry if an SSD failed to respond to a driver using scatter gather methods.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also he stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
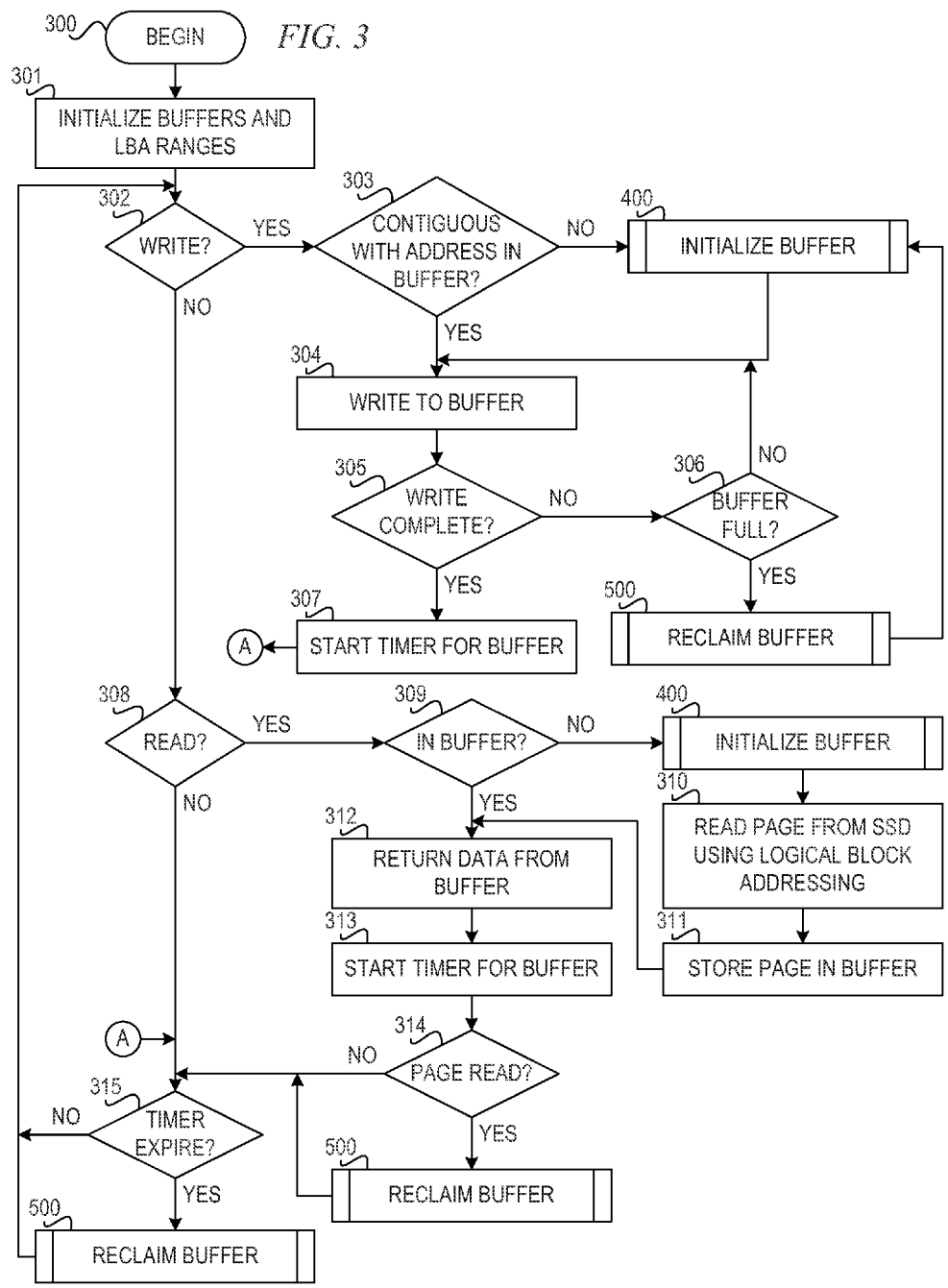
FIG. 3 is a flowchart illustrating operation of a solid-state drive controller for direct memory accessing in a solid-state drive in accordance with an illustrative embodiment.

FIG. 3 is a flowchart illustrating operation of a solid-state drive controller for direct memory accessing in a solid-state drive in accordance with an illustrative embodiment. Operation begins in block 300, and the controller initializes buffers and maps a window of memory addresses to a range of logical block addressing (LBA) blocks (block 301). The host accesses the window of memory addresses as if it is reading and writing to memory. The controller then converts the memory addresses to LBA blocks and persists the data in the buffers to the solid-state drive (SSD) memory in the background, transparent to the host. The controller lists ail available buffers in a free list.

The controller determines whether it receives a write request accessing a memory address within the window of memory addresses from the host (block 302). If the controller receives a write request, the controller determines whether the write request accesses a memory address contiguous with an address in a buffer (block 303). If the write request does not access a memory address that is contiguous with an address in a buffer, the controller initializes a buffer (block 400). Operation of initializing a buffer is described in further detail below with reference to FIG. 4.

Thereafter, or if the write request does access a memory address that is contiguous with an address in a buffer in block 303, the controller writes data to the buffer based on the memory address of the write request (block 304). As described in further detail below, when initializing a buffer, the controller associated the buffer with a memory address range and a timer. The controller services the write request by writing the write data to the buffer according to the memory address range The controller then determines whether the write is complete (block 305). If the write is not complete, the controller determines whether the buffer is full or at least a predetermined percentage full (block 306), If the buffer is not full, operation returns to block 304 to continue writing to the buffer, If the buffer is full in block 306, the controller reclaims the current buffer (block 500), and operation returns to block 400 to initialize a new buffer. Operation of reclaiming a buffer is described in further detail below with reference to FIG. 5. If the write is complete in block 305, the controller starts the timer associated with the buffer (block 307). In this example, the timer records the amount of time since the last access to the buffer. Thereafter, operation proceeds to block 315 to determine whether a timer associated with a buffer expires.

If the controller does not receive a write request in block 302, the controller determines whether it receives a read request accessing a memory address within the window of memory addresses (block 308). If the controller receives a read request, the controller determines whether the memory address is within an address range associated with a buffer (block 309). If the memory address is not associated with a buffer, the controller initializes a buffer (block 400). The controller then reads a page from the SSD memory using logical block addressing according to the mapping (block 310) and stores the page in the buffer (block 311).

Thereafter, or if the memory address is in the address range associated with a buffer, the controller returns data from the buffer (block 312) and starts the timer associated with the buffer (block 313). The controller then determines whether the read access completes reading the full page from the buffer (block 314). If the read access completes reading the page, the controller reclaims the buffer (block 500). Thereafter, or if the read access completes reading the full page from the buffer in block 314, operation proceeds to block 315 to determine whether a timer associated with a buffer expires.

Responsive to the controller not receiving a read request in block 308, the controller determines whether a timer associated with a buffer expires in block 315. If a timer associated with a buffer expires, the controller reclaims the buffer (block 500). Thereafter, or if the controller determines that no timer associated with a buffer expires in block 315, operation returns to block 302 to determine whether the controller receives a read request.

FIG. 4 is a flowchart illustrating operation of a solid-state drive controller for initializing a buffer in accordance with an illustrative embodiment. Operation begins in block 400, and the controller determines whether a buffer is available (block 401). The controller determines whether a buffer is available by checking a free list. If the free list is non-empty, then a buffer is available, and the controller removes a buffer from the free list (block 402). The controller then associates the buffer with a memory address range (block 403) and sets a timer associated with the buffer (block 404). Timer values may be initialized to optimize between minimizing how many times read modify writes or multiple reads have to be performed to service a host request versus stalling host operations while buffers are freed up. Thereafter, operation ends in block 405.

If the controller determines a buffer is not available in block 401, i.e., the free list is empty, the controller identifies a least recently used (LRU) buffer (block 406) and reclaims the buffer (block 500). In the depicted example, the LRU buffer is the buffer with a timer that is closest to expiring. Then, the controller removes the buffer from the free list (block 402), associates the buffer with a memory address range (block 403), and sets a timer associated with the buffer (block 404). Thereafter, operation ends in block 405.

FIG. 5 is a flowchart illustrating operation of a controller for reclaiming a buffer in accordance with an illustrative embodiment. Operation begins in block 500, and the controller persists data in the buffer to a logical block addressing (LBA) range in the solid-state drive memory according to the mapping (block 501), The controller then invalidates the data in the buffer (block 502), returns the buffer to the free list (block 503), and resets the timer for the buffer (block 504). Thereafter, operation ends in block 505.

FIG. 6 is a flowchart illustrating operation of a solid-state controller for persisting data from a buffer to solid-state drive memory in accordance with an illustrative embodiment. Operation begins when the controller receives a write in block 600. the controller determines whether the write begins on a sector boundary based on the mapping (bock 601). If the controller determines the write does not start on a sector or page boundary based on the mapping, the controller reads the sector or page from the persistent media (block 602) and merges the data to the buffer (block 603). The controller then continues to write to the buffer (block 604). Operation ends in block 605, and the controller reclaims the buffer responsive to the buffer being full or the timer associated with the buffer expiring as described above with reference to FIG. 3.

If the write begins on a sector boundary, the controller writes data to a buffer (block 605). Thereafter, operation ends in block 605, and the controller reclaims the buffer responsive to the buffer being full or the timer associated with the buffer expiring as described above with reference to FIG. 3.

FIG. 7 is a flowchart illustrating operation of a controller for converting data to logical block addressing and writing the blocks to a solid-state drive configured for striping in accordance with an illustrative embodiment. The buffers are ready to be written either by timer expiration and read modify writes or complete fill and then passed to some sort of write cache or coalescing memory or the controller could use the buffers directly. Operation begins for a given write to a LUN that is configured for RAID 5 in block 700, and the controller converts the write address to a LBA address (block 701). The controller determines whether the data is less than a stripe (block 702). If the data is less than a stripe in block 702, the controller reads the old data and old parity from the SSD memory (block 703). The controller merges the data with the old stripe (block 704). Then, the controller determines a new parity for the stripe (block 705) and writes the new data and new parity to the LBA block in SSD memory (block 706), and operation ends in block 707. If the data is not less than a stripe in block 702, the controller determines a parity for the data (block 705) and writes the data and parity to the LBA block in SSD memory (block 706), and operation ends in block 707.

It can be seen that this invention can extend to other types of RAID like RAID 6 with Reed Solomon codes or RAID 10 or any RAID code. In fact, once the buffers are full, then the data is sent to a write cache or other staging area and is processed just like data that is accessed via normal scatter gather access methods.

FIG. 8 is a flowchart illustrating operation of a controller for storing in a companion card buffer in accordance with an illustrative embodiment. Operation begins in block 800, and the controller determines whether it receives a write request from a software application (block 801). If the controller receives a write request, the controller stores the write data in one or more memory buffers (block 802). As described above, because the controller stores write data in volatile memory buffers, the data is at risk to be lost should the controller fail due to a power failure or software problem. Thus, the controller stores a copy of the data in the buffers of a companion card or controller (block 803).

Thereafter, or responsive to a determination that the controller does not receive a write request in block 801, the controller determines whether the write data is persisted to non-volatile storage (block 804). If the controller determines the write data is not persisted, operation returns to block 801 to determine whether the controller receives another write request. If the controller determines the write data is persisted in block 804, the controller invalidates the copy in the companion card (block 805), and operation ends in block 806.

FIG. 9 is a flowchart illustrating operation of a controller for handling a power event in accordance with an illustrative embodiment. Operation begins in block 900, and the controller determines whether an early power off warning (EPOW) is received (block 901). An early power off warning may be issued by a power supply responsive to detecting a possible power failure, for example. If the controller does not receive an EPOW, operation returns to block 901 until an EPOW is received. If the controller receives an EPOW in block 901, the controller dumps write data from the buffer memory to battery backed write cache or persistent storage (block 902). Thereafter, operation ends in block 903.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for direct memory addressing for solid-state drives. The mechanism provides a conversion from memory addressing to sector addressing within a solid-state drive. The mechanism initializes the solid-state drive with a window of addresses accessible by software. The software writes blocks of data directly to the window of memory accesses, thus writing directly to the solid-state drive without using a device driver. The solid-state drive includes a plurality of memory buffers. The mechanism writes the blocks written by software to the memory buffers, converts the blocks to sectors in the solid-state drive, and writes the sectors to the solid-state drive.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for direct memory access in a storage device, the method comprising:
   performing a mapping of a window of memory addresses to a logical block addressing (LBA) range of the storage device;
   responsive to receiving from a host a write request specifying a write address within the window of memory addresses, initializing a first memory buffer in the storage device;
   associating the first memory buffer with a first address range within the window of memory addresses such that the write address of the request is within the first address range;
   writing to the first memory buffer based on the write address; and
   responsive to the buffer being full, persisting contents of the first memory buffer to the storage device using logical block addressing based on the mapping.

2. The method of claim 1, further comprising:
   associating the first memory buffer with a first timer;
   responsive to writing to the first memory buffer, restarting the first timer; and
   responsive to detecting expiration of the first timer, persisting contents of the first memory buffer to the storage device.

3. The method of claim 1, further comprising:
   responsive to receiving from the host a read request specifying a read address within the window of memory addresses, determining whether the read address is within an address range of a given memory buffer in the storage device; and
   responsive to determining the read address is within an address range of a given memory buffer, reading from the given memory buffer.

4. The method of claim 3, further comprising:
   responsive to determining the read address is not within an address range of a given memory buffer, initializing a second memory buffer in the storage device;
   associating the second memory buffer with a second address range within the window of memory addresses such that the read address of the request is within the second address range;
   reading a portion of data from the storage device to the second memory buffer using logical block addressing; and
   performing a read operation from the second memory buffer based on the read address.

5. The method of claim 3, further comprising:
   maintaining a free list of available memory buffers in the storage device;
   associating the second memory buffer with a second timer;
   responsive to reading from the second memory buffer, restarting the second timer; and
   responsive to detecting expiration of the second timer, returning the second memory buffer to the free list.

6. The method of claim 1, further comprising:
   maintaining a free list of available memory buffers in the storage device;
   responsive to persisting contents of the first memory buffer, invalidating contents of the first buffer;
   returning the first memory buffer to the free list; and
   resetting the first timer.

7. The method of claim 1, wherein persisting contents of the first memory buffer comprises performing a read-modify-write operation using logical block addressing based on the mapping.

8. The method of claim 1, wherein persisting contents of the first memory buffer comprises:
   responsive to determining a logical block address to which the first address range is mapped does not start on a sector boundary or data for the write does not end on a sector or page boundary, reading a sector or page at the logical block address to which the first address range is mapped from the storage device, merging data from the first memory buffer with the sector or page to form a new sector or page, and writing the new sector or page to the storage device.

9. The method of claim 1, wherein persisting contents of the first memory buffer comprises:
responsive to determining a logical block address to which the first address range is mapped is configured for striping and data for the write request is less than a stripe, reading a stripe at the logical block address to which the first address range is mapped from the storage device, merging data from the first memory buffer with the stripe to form a new stripe, determining a new parity for the new stripe, and writing the new stripe with the new parity to the storage device.

10. The method of claim 1, wherein writing to the first memory buffer comprises:
writing a copy of data of the write request to a memory buffer in a companion storage device.

11. The method of claim 1, further comprising:
dumping contents of the first buffer to a battery backed cache responsive to receiving an early power off warning.

12. The method of claim 1, wherein the storage device comprises a solid-state drive.

13. The method of claim 1, wherein the storage device comprises a peripheral component interconnect (PCI) express card comprising a flash memory controller.

14. The method of claim 1, wherein the storage device comprises a redundant array of independent disks (RAID) controller having a plurality of solid-state drives or a plurality of PCI Express cards connected to the RAID controller.

* * * * *